(12) United States Patent
McCauley

(10) Patent No.: US 11,212,481 B2
(45) Date of Patent: Dec. 28, 2021

(54) SYSTEMS AND METHODS FOR SHARING CAPTURE SETTINGS FOR VISUAL CONTENT CAPTURE

(71) Applicant: GoPro, Inc., San Mateo, CA (US)

(72) Inventor: Grant Adam McCauley, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 17/210,243

(22) Filed: Mar. 23, 2021

(65) Prior Publication Data

US 2021/0211604 A1 Jul. 8, 2021

Related U.S. Application Data

(63) Continuation of application No. 16/417,319, filed on May 20, 2019, now Pat. No. 10,992,899.

(51) Int. Cl.
*H04N 5/765* (2006.01)
*H04N 5/232* (2006.01)
*G06K 7/14* (2006.01)
*G06F 3/0486* (2013.01)

(52) U.S. Cl.
CPC .......... *H04N 5/765* (2013.01); *G06F 3/0486* (2013.01); *G06K 7/1417* (2013.01); *H04N 5/23206* (2013.01); *H04N 5/232939* (2018.08)

(58) Field of Classification Search
CPC ............. H04N 5/765; H04N 5/232939; H04N 5/23206; G06F 3/0486; G06K 7/1417
See application file for complete search history.

(56) References Cited

U.S. PATENT DOCUMENTS

| | | | |
|---|---|---|---|
| 10,200,575 B1* | 2/2019 | Newman | ............. H04N 5/23216 |
| 10,750,058 B2 | 8/2020 | Newman | |
| 2006/0208086 A1 | 9/2006 | Rudeen | |
| 2013/0201211 A1 | 8/2013 | Kim | |
| 2016/0359957 A1 | 12/2016 | Laliberte | |
| 2018/0157885 A1 | 6/2018 | Gurzumar | |
| 2019/0230505 A1* | 7/2019 | Stimm | .................... H04L 63/18 |
| 2020/0036889 A1 | 1/2020 | Udayakumar | |

* cited by examiner

*Primary Examiner* — Mishawn N. Hunter
(74) *Attorney, Agent, or Firm* — Esplin & Associates, PC

(57) ABSTRACT

An image capture device may capture visual content using a capture setting. A machine-readable optical code conveying the capture setting may be generated. The machine-readable optical code may convey the capture setting such that an image capture device capturing an image including the machine-readable optical code: (1) identifies the machine-readable optical code within the image; (2) determines the capture setting conveyed by the machine-readable optical code; and (3) stores the capture setting for use in visual content capture. A graphical user interface may enable a user to associate the machine-readable optical code with the visual content. The association of the machine-readable optical code with the visual content may cause subsequent presentation of the visual content to include presentation of the machine-readable optical code.

20 Claims, 12 Drawing Sheets

SYSTEMS AND METHODS FOR SHARING CAPTURE SETTINGS FOR VISUAL CONTENT CAPTURE

FIELD

This disclosure relates to sharing capture settings of image capture devices using a machine-readable optical code.

BACKGROUND

A user may wish to share one or more capture settings used to capture visual content. Manually describing the capture setting(s) for other users may be difficult and time consuming. Manually setting capture setting(s) of image capture devices in accordance to such description of capture setting(s) may be difficult and time consuming.

SUMMARY

This disclosure relates to sharing capture settings for visual content capture. Capture setting information for visual content may be obtained. The capture setting information may define one or more capture settings of an image capture device used to capture the visual content. A machine-readable optical code may be generated based on the capture setting information and/or other information. The machine-readable optical code may convey the capture setting(s). The machine-readable optical code may be presented on a graphical user interface. The graphical user interface may include one or more interface features that enable a user to associate the machine-readable optical code with the visual content. The association of the machine-readable optical code with the visual content may cause subsequent presentation of the visual content to include presentation of the machine-readable optical code. The machine-readable optical code may convey the capture setting(s) such that an image capture device capturing an image including the machine-readable optical code may: (1) identify the machine-readable optical code within the image; (2) determine the capture setting(s) conveyed by the machine-readable optical code; and (3) store the capture setting(s) for use in visual content capture.

A system that sharing capture settings for visual content capture may include one or more processors, and/or other components. The processor(s) may be configured by machine-readable instructions. Executing the machine-readable instructions may cause the processor(s) to facilitate sharing capture settings for visual content capture. The machine-readable instructions may include one or more computer program components. The computer program components may include one or more of a capture setting component, an optical code component, a presentation component, and/or other computer program components.

The capture setting component may be configured to obtain capture setting information for visual content and/or other information. The capture setting information may define one or more capture settings of an image capture device used to capture the visual content. In some implementations, a capture setting may define one or more aspects of operation for the image capture device, a processor of the image capture device, an image sensor of the image capture device, an optical element of the image capture device, and/or other aspects of operation for the image capture device. In some implementations, one or more aspects of operation for the image capture device may include one or more of a capture mode, a capture resolution, a capture framerate, a capture field of view, a capture visual processing, a capture shutter speed, and/or other aspects of operation for the image capture device(s).

The optical code component may be configured to generate one or more machine-readable optical codes based on the capture setting information and/or other information. A machine-readable optical code may convey the capture setting(s) for one or more image capture devices. A machine-readable optical code may convey the capture setting(s) such that an image capture device capturing an image including the machine-readable optical code may: (1) identify the machine-readable optical code within the image; (2) determine the capture setting(s) conveyed by the machine-readable optical code; and (3) store the capture setting(s) for use in visual content capture.

In some implementations, the capture setting(s) may be stored as one or more capture modes on the image capture device. The capture mode(s) may be used to modify the operation of the image capture device. For example, the image capture device may be operating in according with a particular capture setting, and the use of a capture mode by the image capture device may include the image capture modifying its operation to operate in accordance with the capture setting(s) stored in the capture mode.

The presentation component may be configured to present the machine-readable optical code(s) on a graphical user interface. The graphical user interface may include one or more interface features that enable a user to associate the machine-readable optical code(s) with the visual content such that subsequent presentation of the visual content includes presentation of the machine-readable optical code. The association of the machine-readable optical code(s) with the visual content may cause subsequent presentation of the visual content to include presentation of the machine-readable optical code(s).

In some implementations, the subsequent presentation of the visual content including the presentation of the machine-readable optical code(s) may include the machine-readable optical code(s) being presented before and/or after the subsequent presentation of the visual content. In some implementations, the subsequent presentation of the visual content including the presentation of the machine-readable optical code(s) may include the machine-readable optical code(s) being presented during the subsequent presentation of the visual content.

In some implementations, the machine-readable optical code(s) may be presented on the graphical user interface for potential association with the visual content during presentation of the visual content. During presentation of the visual content, the graphical user interface may enable the user to associate the machine-readable optical code(s) with the visual content.

In some implementations, an interface feature of the graphical user interface that enables the user to associate the machine-readable optical code(s) with the visual content may include one or more drag and drop features. The graphical user interface/the drag and drop feature(s) may enable the user to drag and drop the machine-readable optical code(s) on the visual content. The graphical user interface/the drag and drop feature(s) may enable the user to drag and drop the machine-readable optical code(s) on the presentation of the visual content. The graphical user interface/the drag and drop feature(s) may enable the user to drag and drop the machine-readable optical code(s) on a representation of the visual content.

In some implementations, an interface feature of the graphical user interface that enables the user to associate the machine-readable optical code(s) with the visual content may include one or more toggle features. The graphical user interface/the toggle feature(s) may enable the user to toggle between association and non-association of the machine-readable optical code(s) with the visual content. For example, a toggle feature may be implemented as one or more toggle buttons included in the graphical user interface, and the toggle button(s) may enable the user to toggle between association and non-association of the machine-readable optical code(s) with the visual content.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
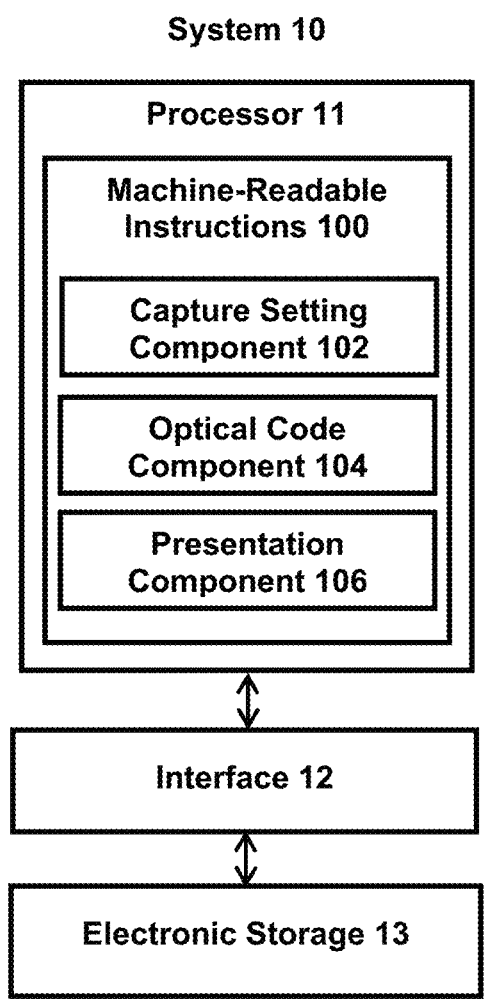
FIG. 1 illustrates a system that shares capture settings for visual content capture.

FIG. 1 illustrates a system 10 for sharing capture settings for visual content capture. The system 10 may include one or more of a processor 11, an interface 12 (e.g., bus, wireless interface), an electronic storage 13, and/or other components. Capture setting information for visual content may be obtained by the processor 11. The capture setting information may define one or more capture settings of an image capture device used to capture the visual content. A machine-readable optical code may be generated by the processor 11 based on the capture setting information and/or other information. The machine-readable optical code may convey the capture setting(s). The machine-readable optical code may be presented on a graphical user interface. The graphical user interface may include one or more interface features that enable a user to associate the machine-readable optical code with the visual content. The association of the machine-readable optical code with the visual content may cause subsequent presentation of the visual content to include presentation of the machine-readable optical code. The machine-readable optical code may convey the capture setting(s) such that an image capture device capturing an image including the machine-readable optical code may: (1) identify the machine-readable optical code within the image; (2) determine the capture setting(s) conveyed by the machine-readable optical code; and (3) store the capture setting(s) for use in visual content capture.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store capture setting information, information relating to capture setting, information relating to image capture devices, information relating to operation of image capture devices, information relating to components of image capture devices (e.g., processor, image sensor, optical element), information relating to machine-readable optical code, information relating to graphical user interface, information relating to interface features, and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine readable instructions 100 to facilitate sharing capture settings for visual content capture. The machine-readable instructions 100 may include one or more computer program components. The machine-readable instructions 100 may include one or more of a capture setting component 102, an optical code component 104, a presentation component 106, and/or other computer program components.

The capture setting component 102 may be configured to obtain capture setting information for visual content and/or other information. Obtaining capture setting information may include one or more of accessing, acquiring, analyzing, determining, examining, identifying, loading, locating, opening, receiving, retrieving, reviewing, storing, and/or otherwise obtaining the capture setting information. The capture setting component 102 may obtain capture setting information from one or more locations. For example, the capture setting component 102 may obtain capture setting information from a storage location, such as the electronic storage 13, electronic storage of information and/or signals generated by one or more image capture devices, electronic storage of a device accessible via a network, and/or other locations. The capture setting component 102 may obtain capture setting information from one or more hardware components (e.g., an image capture device) and/or one or more software components (e.g., software running on a computing device).

In some implementations, the capture setting information may be obtained based on user interaction with a user interface/application (e.g., image/video application), and/or other information. For example, a user interface/application may provide option(s) for a user to select and/or open one or more visual content for which capture settings are to be shared. The capture setting information may be obtained based on the user's selection/opening of the visual content through the user interface/application.

In some implementations, the capture setting component 102 may obtain capture information for visual content based on user access and/or user interaction with the visual content. For example, capture information for visual content may be obtained based on the user accessing the visual content and/or one or more portions of the visual content (e.g., opening the visual content for viewing/editing, opening a gallery including a preview/thumbnail of the visual content). The capture information for visual content may be obtained based on the user interacting with the visual content in one or more particular ways, such as by tagging or marking the visual content.

In some implementations, the capture setting component 102 may obtain capture information for visual content based on capture of the visual content. For instance, based on an image capture device capturing an image or a video, the capture setting component 102 may obtain capture information for the captured image or the captured video.

In some implementations, the capture setting component 102 may obtain capture information for visual content based on the visual content including one or more highlight events and/or other identification of the visual content. A highlight event may refer to capture of visual content that a user may find interesting (e.g., an event of interest). A highlight event may include an exciting, interesting, and/or an important event, such as a high point or a climax of an activity, captured within the visual content. A highlight event may be detected based on analysis of the visual content, analysis of corresponding audio content, analysis of user input (e.g., a user interacting with a highlight button), and/or other information. For example, capture information for one or more images and/or videos (and/or particular video frames of the videos) may be obtained based on the images/videos containing a highlight event (manually or automatically detected), a particular scene/thing/event/activity, and/or other manual/automatic identification of the visual content.

The capture setting information may define one or more capture settings of an image capture device used to capture visual content. Visual content may refer to content of one or more images and/or one or more videos that may be consumed visually. Visual content may be generated based on light received within a field of view of a single image sensor or within fields of view of multiple image sensors during a capture period. For example, visual content may refer to content of one or more images and/or one or more video frames of a video. The video frame(s) may define the visual content of the video. That is, video may include video frame(s) that define the visual content of the video. Video frame(s) may define visual content viewable as a function of progress through a progress length of the video. A video frame may include an image of the video at a moment within the progress length of the video.

In some implementations, visual content may include one or more of spherical visual content, virtual reality content, and/or other visual content. Spherical visual content and/or virtual reality content may include visual content viewable from one or more points of view as a function of progress through the progress length of the spherical/virtual reality visual content.

Figure 3:
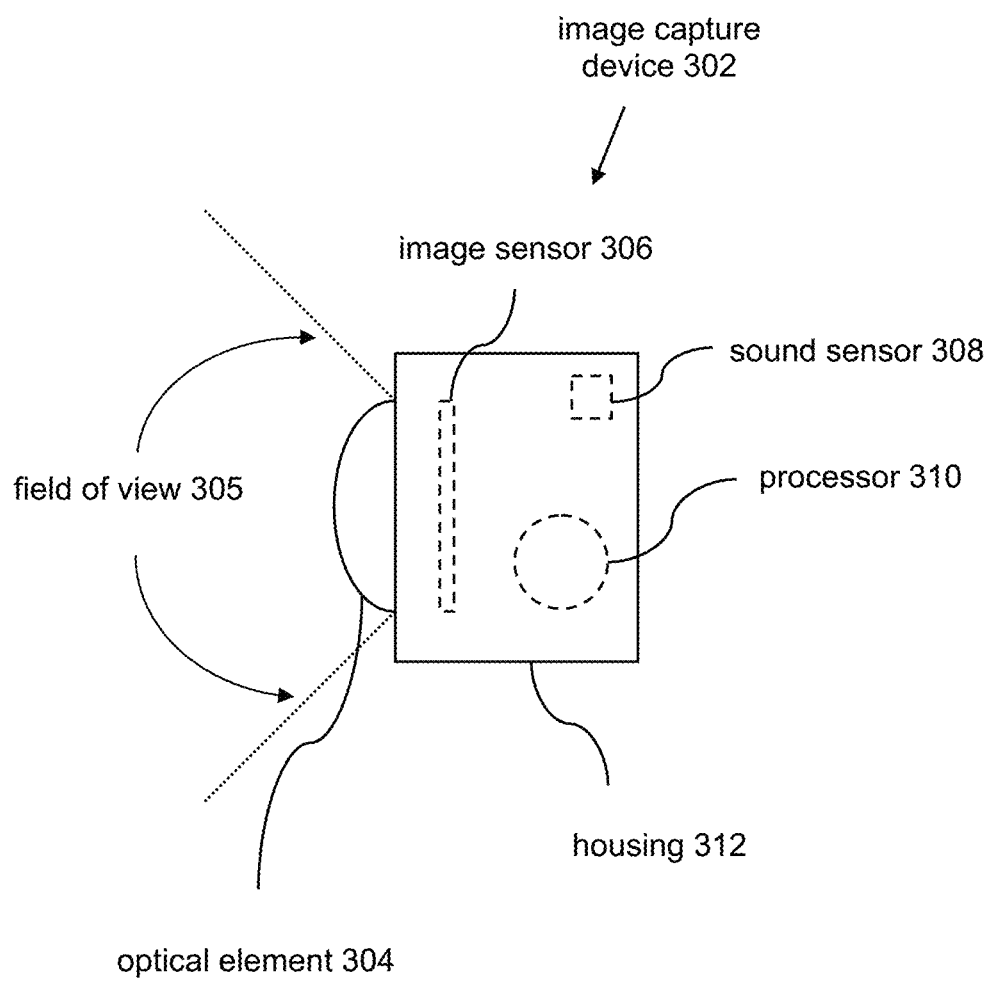
FIG. 3 illustrates an example image capture device.

An image capture device may refer to a device captures visual content. An image capture device may capture visual content in form of images, videos, and/or other forms. An image capture device may be a standalone device (e.g., camera) or may be part of another device (e.g., part of a smartphone). For example, an image capture device may refer to a camera and/or an image sensor. FIG. 3 illustrates an example image capture device 302. Visual content (e.g., of image(s), video frame(s)) may be captured by the image capture device 302. The image capture device 302 may include a housing 312, and the housing 312 may carry (be attached to, support, hold, and/or otherwise carry) one or more of an optical element 304, an image sensor 306, a sound sensor 308, a processor 310, and/or other components. Other configurations of image capture devices are contemplated.

One or more components of the image capture device 302 may be the same as, be similar to, and/or correspond to one or more components of the system 10. For example, the processor 310 may be the same as, be similar to, and/or correspond to the processor 11.

The optical element 304 may include instrument(s), tool(s), and/or medium that acts upon light passing through the instrument(s)/tool(s)/medium. For example, the optical element 304 may include one or more of lens, mirror, prism, and/or other optical elements. The optical element 304 may affect direction, deviation, and/or path of the light passing through the optical element 304. The optical element 304 may have a field of view 305. The optical element 304 may be configured to guide light within the field of view 305 to the image sensor 306. The field of view 305 may include the field of view of a scene that is within the field of view of the optical element 304 and/or the field of view of the scene that is delivered to the image sensor 306. For example, the optical element 304 may guide light within its field of view to the image sensor 306 or may guide light within a portion of its field of view to the image sensor 306. The field of view of 305 of the optical element 304 may refer to the extent of the observable world that is seen through the optical element 304. The field of view 305 of the optical element 304 may include one or more angles (e.g., vertical angle, horizontal angle, diagonal angle) at which light is received and passed on by the optical element 304 to the image sensor 306. In some implementations, the field of view 305 may be greater than or equal to 180-degrees. In some implementations, the field of view 305 may be smaller than or equal to 180-degrees.

The image sensor 306 may include sensor(s) that converts received light into output signals. The output signals may include electrical signals. The image sensor 306 may generate output signals conveying information that defines visual content of one or more images and/or one or more video frames of a video. For example, the image sensor 306 may include one or more of a charge-coupled device sensor, an active pixel sensor, a complementary metal-oxide semiconductor sensor, an N-type metal-oxide-semiconductor sensor, and/or other image sensors.

The image sensor 306 may be configured to generate visual output signals conveying visual information (defining visual content of images and/or videos) based on light that becomes incident thereon and/or other information. The optical element 304 may be configured to guide light within the field of view 305 to the image sensor 306, and the image sensor 306 may be configured to generate visual output signals conveying visual information based on light that becomes incident thereon via the optical element 304.

The sound sensor 308 include sensor(s) that converts received sounds into output signals. The output signals may include electrical signals. The sound sensor 308 may generate output signals conveying information based on the received sounds. For example, sound sensor 308 may be configured to generate a sound output signal conveying audio information based on the received sounds. The audio information may define audio content. The audio content may include one or more reproductions of the received sounds. The audio information may define audio content in one or more formats, such as WAV, MP3, MP4, RAW. The audio information may be stored in one or more locations, such as an electronic storage, storage of the sound sensor 308, remote storage, and/or other locations. While the sound sensor 308 is shown to be carried by the housing 312 in FIG. 3, this is merely an example and is not meant to be limiting. The sound sensor 308 may be remote/separate from the image capture device 302.

The processor 310 may include one or more processors (logic circuitry) that provide information processing capabilities in the image capture device 302. The processor 310 may provide one or more computing functions for the image capture device 302. The processor 310 may operate/send command signals to one or more components of the image capture device 302 to operate the image capture device 302. For example, the processor 310 may facilitate operation of the image capture device 302 in capturing image(s) and/or video(s), facilitate operation of the optical element 304 (e.g., change how light is guided by the optical element 304), facilitate operation of the image sensor 306 (e.g., change how the received light is converted into information that defines images/videos and/or how the images/videos are post-processed after capture), and/or facilitate operation of the sound sensor 308 (e.g., change how the received sound is converted into information that defines audio content and/or how the audio content post-processed after capture).

The processor 310 may obtain information from the image sensor 306 and/or the sound sensor 308, and/or facilitate transfer of information from the image sensor 306 and/or the sound sensor 308 to another device/component. The processor 310 may be remote from the processor 11 or local to the processor 11. One or more portions of the processor 310 may be remote from the processor 11 and/or one or more portions of the processor 10 may be part of the processor 310. The processor 310 may include and/or perform one or more functionalities of the processor 11 shown in FIG. 1.

A capture setting may refer to one or more particular configurations of an image capture device (e.g., the image capture device 302) and/or one or more particular configurations of one or more components of the image capture device (e.g., the optical element 304, the image sensor 306, the sound sensor 308, the processor 310) used to capture visual content (e.g., visual content of one or more images, visual content of one or more video frames). A capture setting may be static (unchanging) or dynamic (changing) during capture of the visual content. A capture setting may control how the image capture device and/or component(s) of the image capture device operate to capture visual content.

In some implementations, a capture setting may define one or more aspects of operation for an image capture device. One or more aspects of operation for the image capture device may include one or more aspects of operation for one or more processors of the image capture device, one or more image sensors of the image capture device, one or more optical elements of the image capture device, and/or other aspects of operation for the image capture device. A capture setting may define one or more aspects of operation for the image capture device(s) for a time, over a period of time, at a location, or over a range of locations. For example, a capture setting may define particular aspect(s) of operation for an image capture device at a particular point in time, during a particular duration of time, at a particular location, and/or over a particular area.

In some implementations, one or more aspects of operation for the image capture device may include one or more of a capture mode, a capture resolution, a capture framerate, a capture field of view, a capture visual processing, a capture shutter speed, and/or other aspects of operation for the image capture device(s). A capture mode may refer to a pre-defined mode of operation for an image capture device. A capture mode may include manual modes and/or automatic modes. In some implementations, a capture mode may include an automatic capture mode. An image capture device operating in an automatic capture mode may capture visual content (e.g., images, videos) based on detection of particular visuals and/or audio. For example, an image capture device operating in an automatic capture mode may capture video content based on detection of a particular object, a particular action, a particular machine-readable optical code, a particular sound, and/or detection of other things/activity/events. A capture resolution may define the resolution at which visual content is captured. A capture frame rate may define the frame rate at which visual content is captured. A capture field of view may define the extent of an environment observable by an image capture device from a position/orientation. A capture visual processing may define visual manipulation performed by an image capture device during and/or after capture of visual content. A capture shutter speed may define the shutter speed at which visual content is captured. Other aspects of operation for the image capture device(s) are contemplated.

For example, one or more aspects of operation for the image capture device(s) may include single image capture, burst image capture, time lapse capture, image resolution, image framerate, camera field of view, zoom, image projection, image color balance, tonal curve, exposure compensation, color saturation, contrast, sharpening, softening, gamma, ISO limit, video stabilization, shutter speed, encoding parameters (e.g., codec type (H.264, HEVC), I-frame interval, macroblock size, deblocking filter, QP, capture timing (e.g., auto, interval, continuous, loop), and/or other aspects.

In some implementations, one or more aspects of operation for the image capture device(s) may include aspects of operation for one or more microphone/sound sensors of the image capture device(s). For example, one or more aspects of operation for the image capture device(s) may include number of channels, sample rate, compression format (e.g., AAC, MP3), averaging/filter window duration, and/or other aspects.

In some implementations, a capture setting may include one or more conditional aspects of operation for the image capture device(s). For example, a capture setting may define a particular operation to be performed by an image capture device based on occurrence of one or more events. A capture setting may include conditional statements (e.g., If This Then That) that provides for one or more particular operations based on certain conditions. For example, a capture setting may define different capture resolutions and/or frame rates for an image capture device based on the type of visuals the image capture device is configured to capture (e.g., action mode, still mode). One or more particular conditional aspects of operation may be stored as one or more capture modes. Other conditional aspects of operation for the image capture device(s) are contemplated.

In some implementations, obtaining capture setting information for visual content may include obtaining information relating to the visual content. For example, capture setting information and/or information from which the capture setting information may be determined may be stored as part of the visual content and/or as part of information associated with the visual content (e.g., metadata for the visual content). For instance, visual content may have been captured using one or more capture settings, and the capture setting(s) may be stored in capture information for the visual content. The capture information may be stored separately from the visual content and/or with the visual content. For example, the capture information may be stored in metadata of an image or a video. The metadata may be part of the file defining the image/video and/or part of another file. Storage of the capture setting(s) in capture information may enable the system 10 to retrieve capture settings for particular visual content (e.g., retrieve capture setting(s) for image/video).

In some implementations, obtaining capture setting information for visual content may include analyzing the visual content. For example, the capture setting component 102 may analyze one or more visual characteristics of the visual content to determine and/or estimate the capture setting(s) (capture setting information) used to capture the visual content. The capture setting component 102 may use other information about the capture of the visual content to determine and/or estimate the capture setting(s) (capture setting information). For example, the capture setting component 102 may use information about the image capture device (e.g., model type, model number) and/or information from the image capture device (e.g., metadata from the image capture device) to determine and/or estimate the capture setting(s) (capture setting information).

In some implementations, the capture setting component 102 may change the capture setting information. The capture setting component 102 may determining change(s) to the capture setting information based on user input and/or other information. For example, the capture setting component 102 may determine change(s) to the capture setting information based on user input received via a button press, an interaction with a touchscreen interface, a wireless command received from another device, a voice command, a visual command, and/or other information. For instance, the capture setting component 102 may obtain capture setting information defining a capture setting of an image capture device used to capture a particular image. The capture setting component 102 may present the capture setting to a user (e.g., via one or more user interfaces) and enable the user to change the capture setting.

For example, the capture setting component 102 may enable a user to change one or more aspects of operation of the image capture device defined by the capture setting, remove one or more aspects of operation of the image capture device defined by the capture setting, and/or add one or more aspects of operation of the image capture device to the capture setting. Such changing of the capture setting(s) may enable a user to retrieve a capture setting used to capture visual content and make modification to the retrieved capture setting (e.g., before sharing the capture setting). Such changing of the capture setting(s) may enable a user to decide which portions of the capture setting is to be shared (e.g., via one or more machine-readable optical codes).

The optical code component 104 may be configured to generate one or more machine-readable optical codes based on the capture setting information and/or other information. A machine-readable optical code may include a visual representation of data. The visual representation of data may be readable by a computing device (e.g., image capture device) based on capture of an image (e.g., a preview image, a standalone image, an image within an image burst, a video frame) including the machine-readable optical code. A machine-readable optical code may encode the data visually by varying the size and shape of patterns within the machine-readable optical code. The data may be encoded within a machine-readable optical code using one or more encoding modes. A machine-readable optical code may convey one or more capture settings. A machine-readable optical code may convey capture setting(s) via the size, shape, and/or other visual aspects of pattern(s) within the machine-readable optical code.

In some implementations, a machine-readable optical code may include a one-dimensional machine-readable optical code (e.g., continuous or discrete barcodes), a two-dimensional machine-readable optical code (e.g., QR code), and/or a three-dimensional machine-readable optical code (e.g., holograms). In some implementations, a machine-readable optical code may include one or more varying components (e.g., a barcode/QR code/hologram that changes with time/location).

In some implementations, a machine-readable optical code may have dimensions of 480 pixels by 320 pixels. A machine-readable optical code may include one or more corner elements (e.g., four or fewer corners for a QR code) that enable machine-readable optical code recognition while adjusting for scale, orientation, non-parallel reading plane, and data placed within the frame. Other dimensions and types of machine-readable optical codes are contemplated.

A machine-readable optical code may convey capture setting(s) used by an image capture device to capture visual content. A machine-readable optical code may convey the capture setting(s) for one or more image capture devices. A machine-readable optical code may convey the capture setting(s) for particular image capture device(s) (e.g., image capture device(s) having particular identifier(s), image capture device(s) associated with particular user(s)). A machine-readable optical code may convey the capture setting(s) for particular types of image capture device (e.g., image capture devices of a particular brand, a particular model of image capture devices). A machine-readable optical code may convey the capture setting(s) for image capture device(s) with capability to decode the information contained within the machine-readable optical code. Thus, a single machine-readable optical code may convey capture setting(s) to be used by a single image capture device or may convey the same capture setting(s) to be used by multiple image capture devices.

The machine-readable optical code and/or the capture setting(s) conveyed by the machine-readable optical code may convey one or more names. For example, a machine-readable optical code conveying a capture setting may also convey the name of the capture setting name. The capture setting name may be automatically generated by the optical code component 104, may be same as the name of the capture setting used by an image capture device to capture the visual content, and/or may be set by a user. For example, an image capture device may have used a capture setting named "Capture Mode A" to capture visual content, and a machine-readable optical code conveying the capture setting "Capture Mode A" may also convey the name "Capture Mode A." Alternative and/or in addition, a user may be prompted to name the capture setting when the machine-readable optical code is generated and/or is to be generated.

The machine-readable optical code may convey the capture setting(s) such that one or more image capture devices capturing an image including the machine-readable optical code may: (1) identify the machine-readable optical code within the image; (2) determine the capture setting(s) conveyed by the machine-readable optical code; and (3) store the capture setting(s) for use in visual content capture.

In some implementations, the capture setting(s) may be stored as one or more capture modes on the image capture device. A capture mode may refer to a pre-defined mode of operation for an image capture device. The capture mode(s) may be used to modify the operation of the image capture device and/or modify the operation of one or more components of the image capture device. Modifying the operation of the image capture device/component(s) of the image capture device may include changing one or more aspects of current operation of the image capture device/component(s) of the image capture device to match the aspect(s) of the operation defined by the capture mode. For example, the image capture device may be operating in according with a particular capture setting, and the use of a capture mode by the image capture device may include the image capture modifying its operation to operate in accordance with the capture setting(s) stored in the capture mode.

For instance, the image capture device may be operating in accordance with a default capture setting, a custom capture setting, and/or a capture setting of a different capture mode. Use of the stored capture mode on the image capture device may include the image capture device changing its operation capture setting to the capture setting of the stored capture mode. In some implementation, the original capture setting of the image capture device may be temporarily stored so that the operation of the image capture device may be switched back to the original capture setting after the capture mode has been used.

Figure 4A:
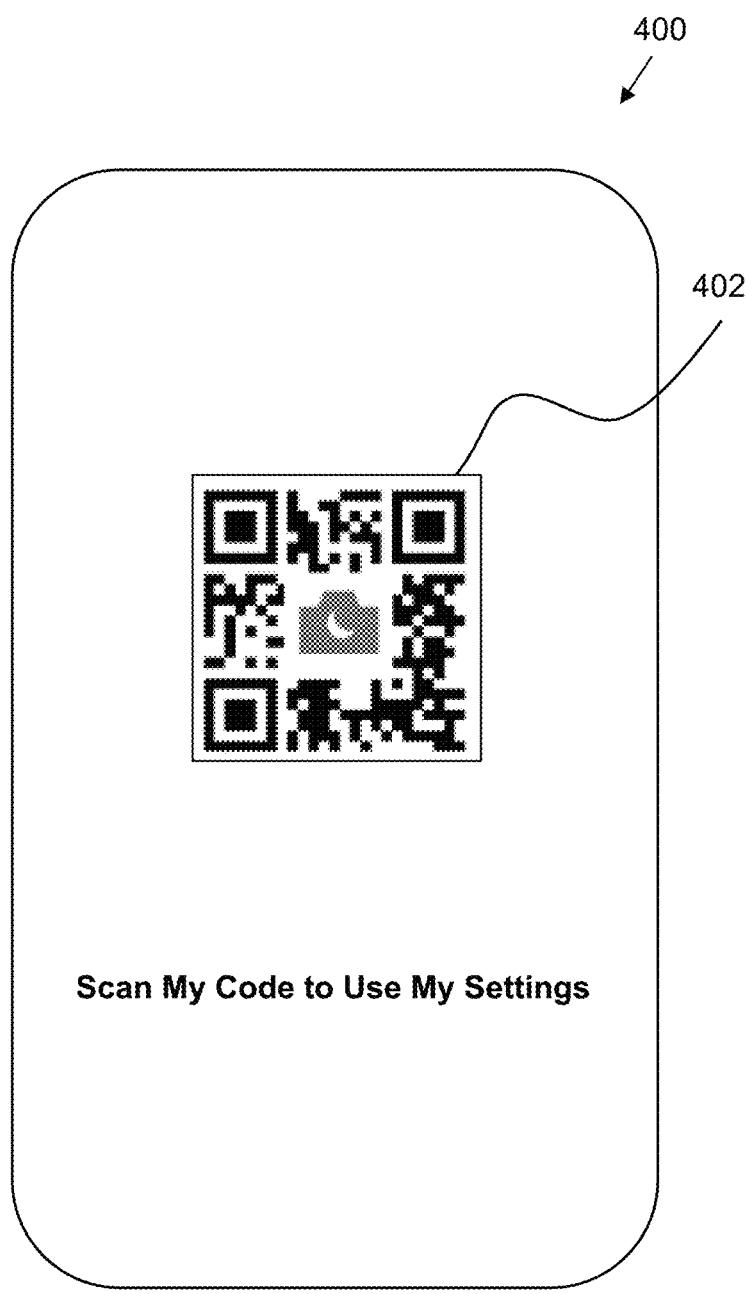
FIG. 4A illustrates an example presentation of a machine-readable optical code.

For example, FIG. 4A illustrates an example presentation of a machine-readable optical code 402. The machine-readable optical code 402 may be presented on a presentation medium 400. The presentation medium 400 may refer to one or more substances that effects or conveys visual information. For example, the presentation medium 400 may include one or more displays (e.g., display(s) of the system 10, display(s) coupled to the system 10, display(s) local to the system 10, display(s) remote from the system 10), one or more printing surfaces (e.g., paper(s), poster(s), fabric(s), wall(s)), one or more projection surfaces (e.g., light projection surface(s), such as a wall or a projection screen), and/or other presentation media. For instance, the machine-readable optical code 402 may be presented on a display of the system 10. The presentation medium 400 may include presentation other information, such as a message indicating that the machine-readable optical code 402 may be scanned by an image capture device to use capture setting(s) conveyed by the machine-readable optical code 402.

Figure 4B:
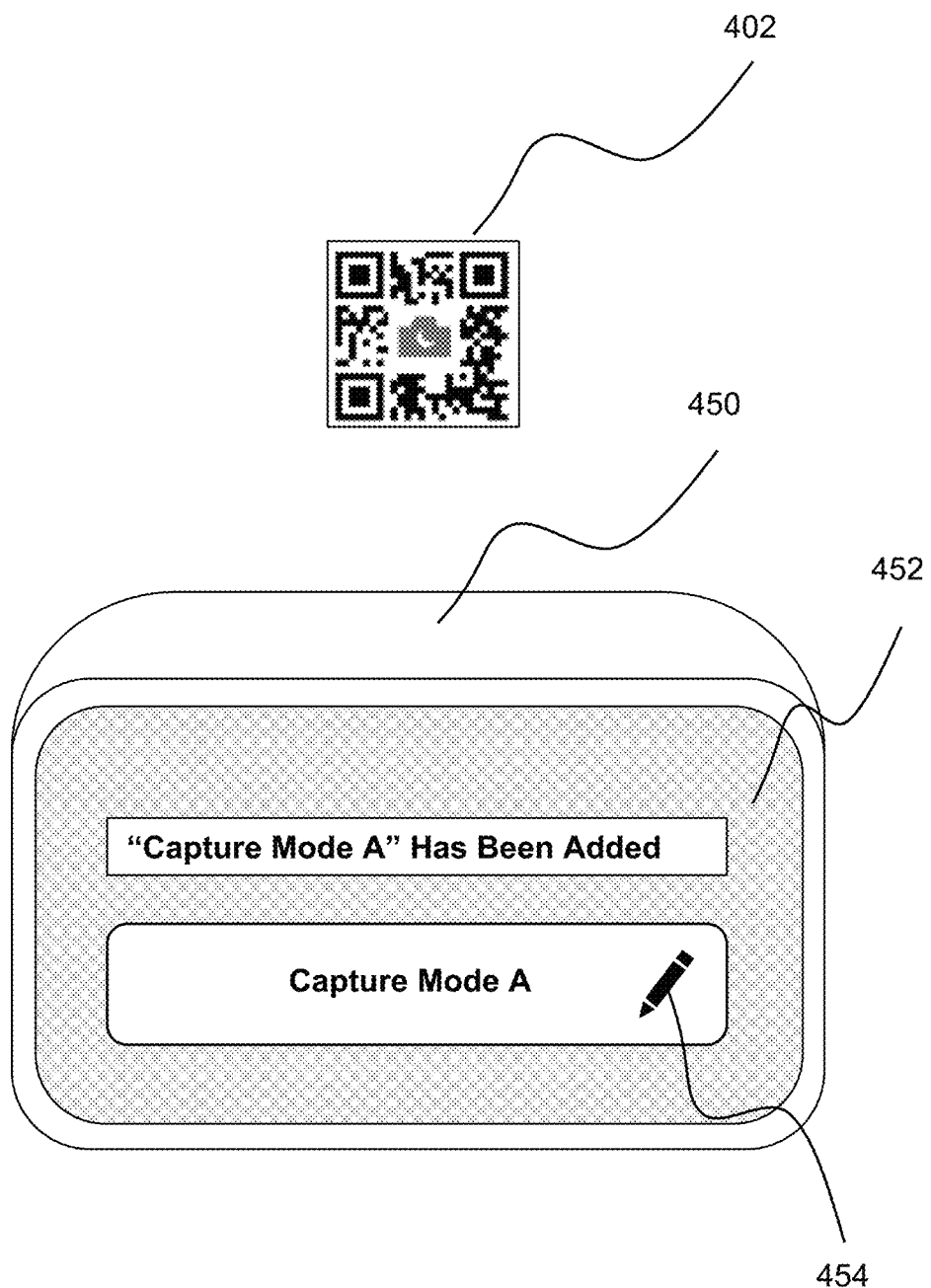
FIG. 4B illustrates an example image capture device capturing an image including a machine-readable optical code.

FIG. 4B illustrates an example image capture device 450 capturing an image including the machine-readable optical code 402. The machine-readable optical code 402 may convey capture setting(s) such that the image capture device 450 and/or other image capture device(s) capturing an image including the machine-readable optical code 402 may decode the capture setting(s) conveyed by the machine-readable optical code 402. Capturing an image include the machine-readable optical code 402 may include the image capture device 450 being pointed towards the machine-readable optical code 402 such that the machine-readable optical code 402 is within the field of view of the image capture device 450. Capturing an image include the machine-readable optical code 402 may include the image capture device 450 generating information that defines visual content (e.g., images, video frames) including one or more depictions of the machine-readable optical code 402. For example, the image capture device may capture one or more images (e.g., a preview image, a standalone image, an image within an image burst, a video frame) including the machine-readable optical code 402. The captured image may include an image that is stored for later retrieval (e.g., image saved by the image capture device) and/or an image that may be stored for later retrieval (e.g., image presented on a display of the image capture device as a preview of an image to be saved by the image capture device).

The image capture device 450 may identify the machine-readable optical code 402 within the captured image. The image capture device 450 may identify the machine-readable optical code 402 based on visual analysis (e.g., scan) of the captured image. The image capture device 450 may decode the machine-readable optical code 402 within the captured image to determine the capture setting(s) conveyed by the machine-readable optical code 402. The image capture device 450 may store the capture setting(s) conveyed by the machine-readable optical code 402 for use in visual content capture. For example, the machine-readable optical code 402 may convey a particular capture setting. The image capture device 450 may store the capture setting within its memory. For example, the image capture device 450 may store the capture setting as a capture mode which may be used and/or selected to capture visual content. In some implementations, the image capture device 450 may change its current setting(s) in accordance with the capture setting(s) conveyed by the machine-readable optical code 402.

The image capture device 450 may provide feedback user that the capture setting has been stored. For instance, referring to FIG. 4B, the image capture device 450 may include a display 452, and the image capture device 450 may present a message on its display 452 that "Capture Mode A" has been added to its list of capture modes. That is, the capture setting(s) conveyed by the machine-readable optical code 402 may have been stored as Capture Mode A on the image capture device 450.

The image capture device 450 may provide one or more options that enable a user to make modifications (e.g., change name, change capture setting, delete) to the stored capture settings. For example, the image capture device 450 may present an edit option 454 on tis display 452, and the user may engage the edit option 454 to make modifications to the stored "Capture Mode A."

In some implementations, one or more image capture devices (e.g., the image capture device 450) may be configured to decode the machine-readable optical code using a lower-resolution. Decoding the machine-readable optical codes using full resolution may require expenditure of more resources (e.g., computing power/time, memory storage) than necessary. The image capture device(s) may be configured to utilize lower resolution version of the image including the machine-readable optical code for decoding the machine-readable optical codes. In some implementations, an image (e.g., a lower resolution image) for decoding the machine-readable optical codes may be transformed into a two-tone representation (e.g., black and white). The two-tone image may be analyzed in order to determine a spatial pattern of the machine-readable optical code and determine the capture setting(s) conveyed by the machine-readable optical code.

In some implementations, capture setting(s) conveyed by a machine-readable optical code may be relayed to one or more images capture device by another device. For instance, another device may be used to scan the machine-readable optical code and relay information about the machine-readable optical code to an image capture device. The image capture device may utilize the capture setting(s) conveyed by the machine-readable optical code based on the information received from the other device.

For example, a mobile device (e.g., smartphone, tablet, laptop) may include a camera component (e.g., optical element, image sensor) with which it captures an image including the machine-readable optical code. The mobile device may communicate with an image capture device (e.g., standalone camera, mobile device with a camera) to transmit information about the machine-readable optical code to the image capture device. In some implementations, the mobile device may include software and/or hardware that allow the mobile device to operate in one or more modes to scan and/or extract the capture setting(s) from the machine-readable optical code, and/or to relay information about the machine-readable optical code to an image capture device.

Information about the machine-readable optical code may include information defining the image including the machine-readable optical code, information defining the machine-readable optical code, information defining the capture setting(s) conveyed by the machine-readable optical code, and/or other information. For example, the mobile device may relay to the image capture device the image including the machine-readable optical code, and the image capture device may scan the image to extract the capture setting(s) conveyed by the machine-readable optical code within the image. The mobile device may relay to the image capture device the machine-readable optical code (e.g., an image of the machine-readable optical code, a visual representation of the machine-readable optical code, information defining a shape of the machine-readable optical code), and the image capture device may extract the capture setting(s) from the machine-readable optical code. The mobile device may extract the capture setting(s) from the machine-readable optical code and relay information defining the capture setting(s) to the image capture device. Such relaying of information about the machine-readable optical code may allow a user to scan the machine-readable optical code with the mobile device and later synchronize the mobile device with an image capture device to relay the capture setting(s) conveyed by the machine-readable optical code.

The presentation component 106 may be configured to present one or more machine-readable optical codes on a graphical user interface. A graphical user interface may refer to an interface through which a user may interact with a computing device, such as the system 10. A graphical user interface may include one or more visual representations (e.g., icons, menus, graphics) to display information and/or user controls. A graphical user interface may be presented on one or more displays. In some implementations, a display may include a touchscreen display. A touchscreen display may be configured to receive user input via user engagement with the touchscreen display. A user may engage with the touchscreen display via interaction with one or more touch-sensitive surfaces/screens and/or other components of the touchscreen display. For example, a user may provide different inputs to a computing device via one or more of tapping, pressing, touching and holding, and/or moving one or more fingers, one or more stylus, and/or other apparatus along a touch-sensitive surface/screen of the touchscreen display.

The graphical user interface may include one or more interface features that enable a user to associate machine-readable optical code(s) with the visual content such that subsequent presentation of the visual content includes presentation of the machine-readable optical code(s). Association of a machine-readable optical code with visual content may include association of the machine-readable optical code with the original visual content captured using the capture setting(s) conveyed by the machine-readable topical code, association of the machine-readable optical code with one or more copies of the visual content, association of the machine-readable optical code with one or more versions of the visual content, and/or other association of the machine-readable optical code with the visual content.

An interface feature may refer to a part, an attribute, a characteristic, and/or a property of the graphical user interface that allows a user to interact with one or more visual representations on the graphical user interface. For example, an interface feature may include one or more visual representations that may be selected by a user, changed by a user, positioned by a user, and/or otherwise interacted by a user. An interface feature may allow a user to interact with one or more visual representations on the graphical user interface to associate machine-readable optical code(s) with the visual content.

In some implementations, machine-readable optical code(s) may be presented on the graphical user interface for potential association with the visual content during presentation of the visual content. Presentation of the visual content may include presentation of a full-resolution version of the visual content (e.g., display of an image, playback of a video), presentation of a lower-resolution version of the visual content (e.g., display of a thumbnail, playback of a lower resolution video), presentation of a visual representation of the visual content (e.g., display of an icon representing the visual content), and/or other presentation of the visual content. During presentation of the visual content, the graphical user interface may enable the user to associate the machine-readable optical code(s) with the visual content.

Figure 5A:
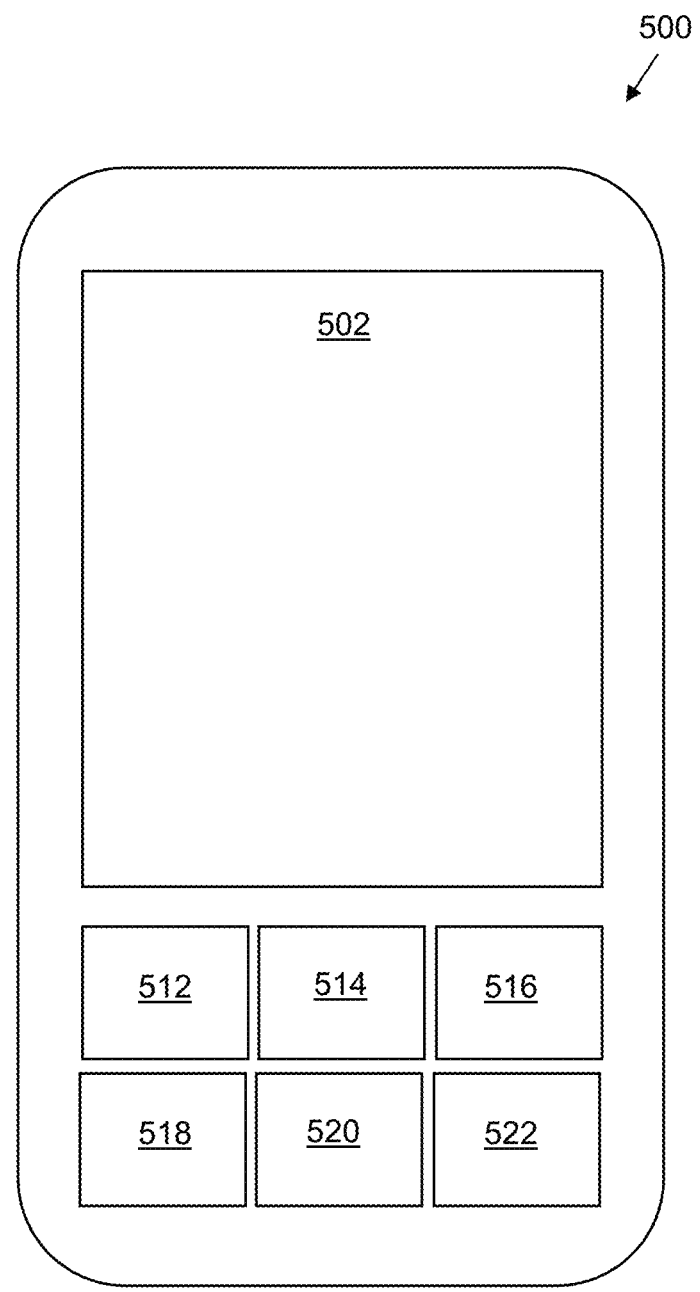
FIG. 5A illustrates an example graphical user interface for associating a machine-readable optical code with visual content.

For example, FIG. 5A illustrates an example graphical user interface 500 for associating a machine-readable optical code with visual content. The graphical user interface 500 may include a display portion 502 and visual representation portions 512, 514, 516, 518, 520, 522. The display portion 502 may present visual content. The presentation of the visual content may be ongoing or paused. For example, the visual content may include content of a video, and the display portion 502 may include presentation of the video (e.g., ongoing playback, paused playback).

The visual representation portions 512, 514, 516, 518, 520, 522 may include presentation of one or more visual representations of information relating to the visual content. For example, the visual representation portions 512, 514, 516, 518, 520, 522 may include presentation of visual representation of metadata (e.g., date, user, resolution, color, size) relating to the visual content, motion (e.g., speed, acceleration) relating to capture of the visual content, geographic locations (e.g., map, GPS data) relating to capture of the visual content, direction (e.g., navigation) of capture of the visual content, and/or other information relating to the visual content. One or more of the visual representation portions 512, 514, 516, 518, 520, 522 may include presentation of a machine-readable optical code. A presentation of a machine-readable optical code may include presentation of a full-resolution version of the machine-readable optical code, presentation of a lower-resolution version of the machine-readable optical code, presentation of a visual representation of the machine-readable optical code (e.g., display of an icon representing the visual content), and/or other presentation of the machine-readable optical code. A user may interact with the presentation of the machine-readable optical code and/or the presentation of the visual content on the graphical user interface 500 to associate the machine-readable optical code with the visual content.

For example, an interface feature of the graphical user interface that enables the user to associate the machine-readable optical code(s) with the visual content may include one or more drag and drop features. A drag and drop feature may refer to an interface feature that allows a user to move one or more visual representations within the graphical user interface and allow the user to make a selection by releasing (dropping) the visual representation(s) at a particular location within the graphical user interface. The graphical user interface/the drag and drop feature(s) may enable the user to drag and drop the machine-readable optical code(s) on the visual content. For example, the graphical user interface/the drag and drop feature(s) may enable the user to drag and drop the machine-readable optical code(s) on a presentation of the visual content and/or on a representation of the visual content to associate the machine-readable optical code(s) with the visual content.

Figure 5B:
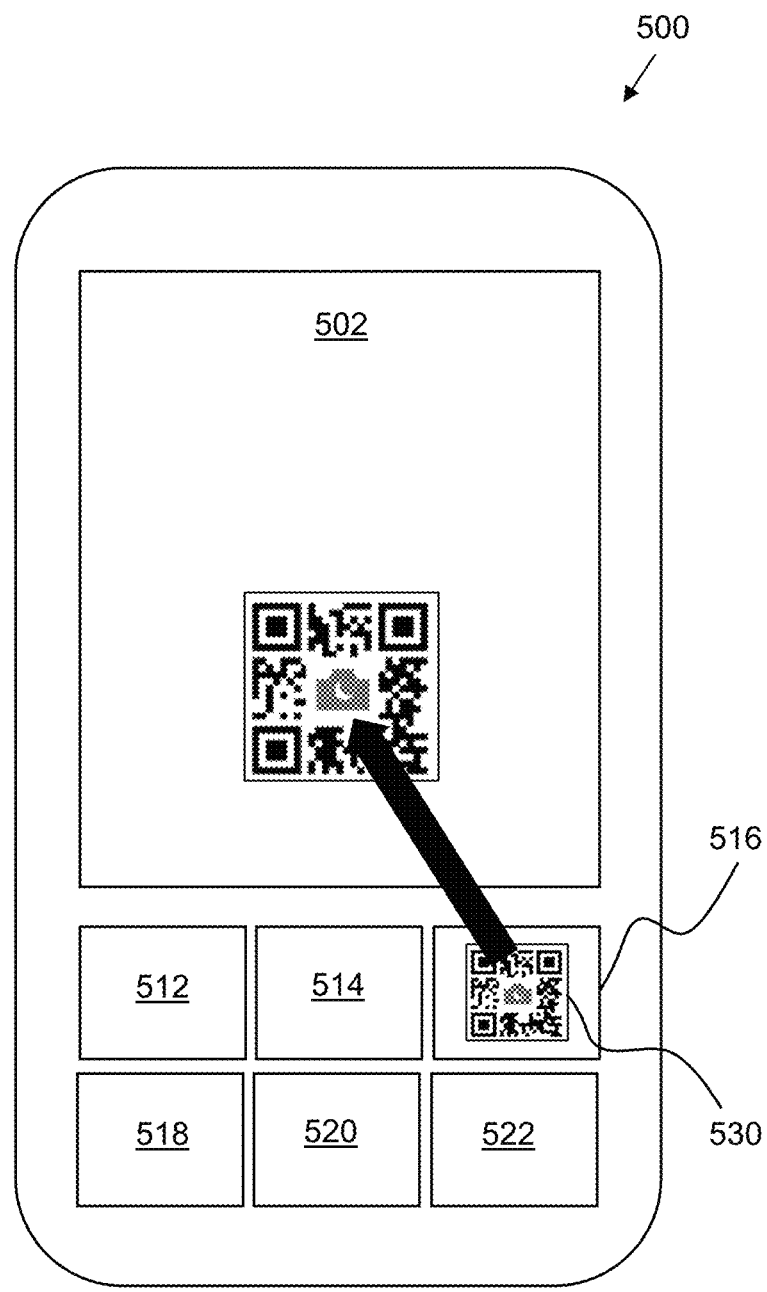
FIG. 5B illustrates an example drag and drop feature of a graphical user interface for associating a machine-readable optical code with visual content.

FIG. 5B illustrates an example drag and drop feature of the graphical user interface 500. As shown in FIG. 5B, the visual representation portion 516 of the graphical user interface 500 may include presentation of a machine-readable optical code 530. A drag and drop feature of the graphical user interface 500 may enable the user to drag and drop the machine-readable optical code 530 on the visual content presented in the display portion 502. For example, the user may move a visual representation of the machine-readable optical code 530 from the visual representation portion 516 to a location within the display portion 502 (e.g., using a cursor, using a finger on a touchscreen display). Such interaction of the user with the graphical user interface 500 may associate the machine-readable optical code 530 with the visual content presented within the display portion 502.

In some implementations, the graphical user interface 500, to associate the machine-readable optical code 530 with the visual content presented within the display portion 502, may require the user to drop the visual representation of the machine-readable optical code 530 within one or more particular locations within the display portion 502 (e.g., center portion). In some implementations, the location of the display portion 502 into which the visual representation of the machine-readable optical code 530 is dropped may determine how the machine-readable optical code 530 is presented during subsequent presentation of the visual content.

An interface feature of the graphical user interface that enables the user to associate the machine-readable optical code(s) with the visual content may include one or more toggle features. A toggle feature may refer to an interface feature that allows a user to switch a machine-readable optical code between being associated and not being associated with the visual content. The graphical user interface/ the toggle feature(s) may enable the user to toggle between association and non-association of the machine-readable optical code(s) with the visual content. For example, the graphical user interface may include one or more visual representations that may be interacted on by the user to switch between association and non-association of the machine-readable optical code(s) with the visual content. For instance, a toggle feature may be implemented as one or more toggle buttons included in the graphical user interface, and the toggle button(s) may enable the user to toggle between association and non-association of the machine-readable optical code(s) with the visual content. A toggle button may be a button separate from other portions of the graphical user interface (e.g., dedicated toggle button) and/or may be part of other portions of the graphical user interface (e.g., part of the visual representation of the machine-readable optical code). A toggle feature may be implemented as one or more toggle menus included in the graphical user interface. A toggle menu may include one or more options for the user to toggle between association and non-association of the machine-readable optical code(s) with the visual content.

Figure 5C:
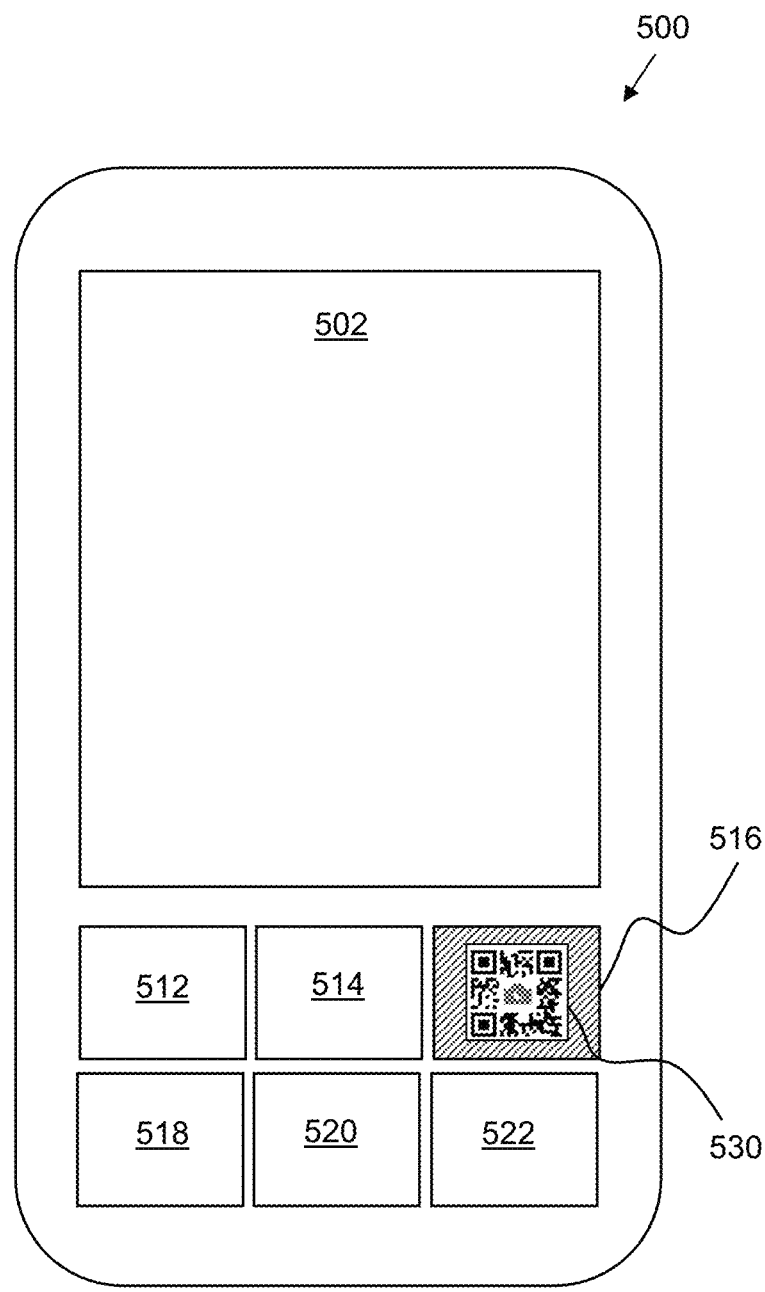
FIG. 5C illustrates an example toggle feature of a graphical user interface for associating a machine-readable optical code with visual content.

FIG. 5C illustrates an example toggle feature of the graphical user interface 500. As shown in FIG. 5C, the visual representation portion 516 of the graphical user interface 500 may include presentation of the machine-readable optical code 530. A toggle feature of the graphical user interface 500 may enable the user to interact with the visual representation portion 516 and/or one or more portions of the visual representation portion 516 to toggle between association and non-association of the machine-readable optical code 530 with the visual content presented in the display portion 502. For instance, the visual representation portion 516 may act as a button which may be pressed/clicked by the user (e.g., using a cursor, using a finger on a touchscreen display). Such user engagement by the user may switch the association/non-association of the machine-readable optical code 530 with the visual content presented in the display portion 502 (e.g., from being not associated to being associated, from being associated to not being associated).

In some implementations, the graphical user interface 500 may provide information on whether a machine-readable optical code has been associated or not associated with visual content. For example, one or more visual characteristics of the graphical user interface 500, the visual content presented on the graphical user interface 500, the machine-readable optical code presented on the graphical user interface 500 may be changed based on whether the machine-readable optical code has or has not been associated the visual content. For instance, referring to FIG. 5C, based on user engaging with the visual representation portion 516 to toggle-on the association of the machine-readable optical code 530 with the visual content, the presentation of the machine-readable optical code 530 within the visual representation portion 516 may be changed (e.g., one or more portions of the visual representation portion 516 changing color and/or brightness).

Figure 6:
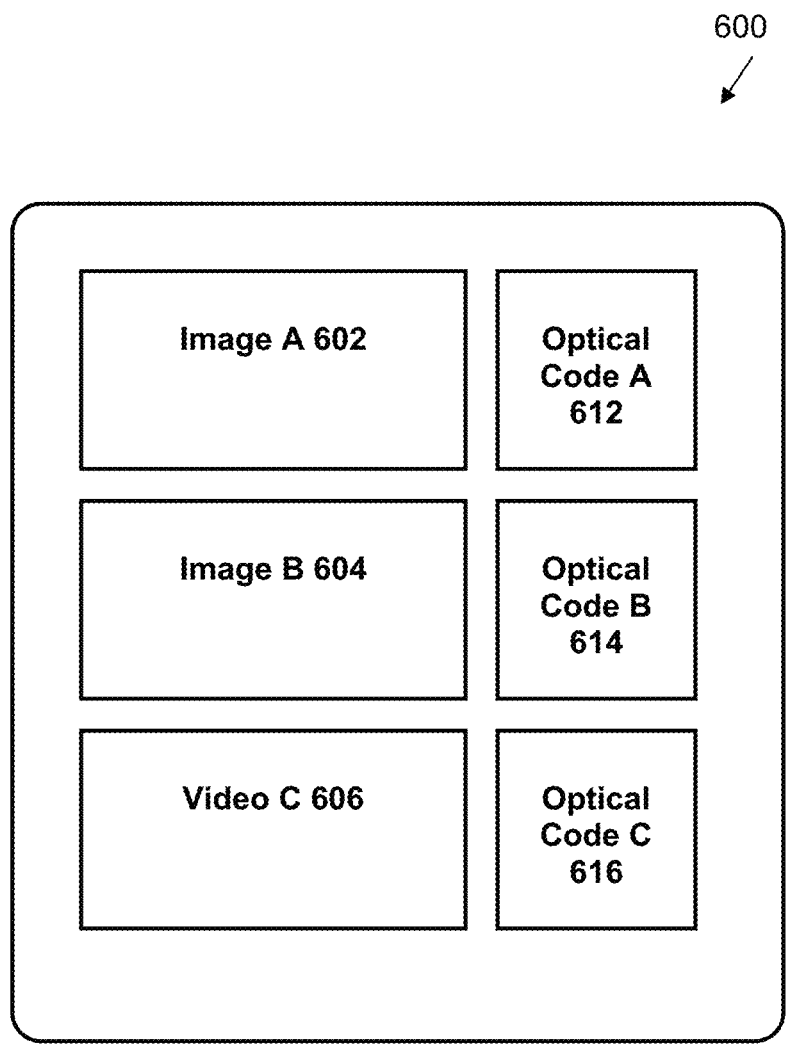
FIG. 6 illustrates an example gallery view of a graphical user interface for associating a machine-readable optical code with visual content.

In some implementations, the graphical user interface may enable a user to associate machine-readable optical code for multiple visual content. For example, FIG. 6 illustrates an example gallery view 600 of a graphical user interface for associating a machine-readable optical code with visual content. The gallery view 600 may provide visual representation of multiple visual content (e.g., image A 602, image B 604, video C 606), such as thumbnail and/or icons of the different visual content. The gallery view 600 may provide visual representation of machine-readable optical codes corresponding to the different visual content (e.g., optical code A 612, optical code B 614, optical code C 616). For example, the optical code A 612 may convey capture setting(s) used to capture the image A 602. The optical code B 614 may convey capture setting(s) used to capture the image B 604. The optical code C 616 may convey capture setting(s) used to capture the video C 606. The gallery view 600 may include one or more drag and drop features, one or more toggle features, and/or other interface features. For instance, a user may associate the optical code A 612 with the image A 602 may dragging and dropping the optical code A 612 onto the image A 602. A user may toggle the association of the optical code C 616 with the video C 606 by clicking on the optical code C 616. Other types of graphical user interfaces and interface features are contemplated.

The association of a machine-readable optical code with visual content may cause subsequent presentation of the visual content to include presentation of the machine-readable optical code. Such association of the machine-readable optical code with the visual content may enable a user to easily share capture setting(s) for capturing visual content with others. Such association of the machine-readable optical code with the visual content may enable a user to easily set up an image capture device with other's capture settings.

As image capture devices become smaller, physically interacting with buttons or touchscreens of the image capture devices to configure the image capture devices may become more difficult. Use of the machine-readable optical code to configure image capture devices may allow a user to set up one or more image capture devices without using an interface of the image capture device(s) (e.g., button presses, screen swipes) or a connection to another device (e.g., Bluetooth or WiFi pairing). A user watching a presentation of visual content associated with a machine-readable optical code may see the machine-readable optical code (e.g., during presentation of the visual content), and point the image capture device at the machine-readable optical code to store the capture setting(s) conveyed by the machine-readable optical code within the image capture device. Thus, the machine-readable optical code may be used to automatically configure the image capture device and/or automatically save certain configuration of the image capture device.

For example, a user may have captured a video using a capture setting. Associating a machine-readable optical code conveying the capture setting may cause a subsequent playback of the video to include presentation of the machine-readable optical code (include a sticker of the machine-readable optical code). For instance, a user may associate the machine-readable optical code with a copy of the video before sharing the copy of the video with one or more other users (e.g., sharing the copy of the video on social media). Other users that view the shared video may save the capture setting within their own image capture devices by simply capturing the machine-readable optical code with their own image capture devices (e.g., saving an image including the machine-readable optical code, pointing the image capture device at the machine-readable optical code).

A subsequent presentation of the visual content including a presentation of the machine-readable optical code may include the machine-readable optical code being spatially arranged with the visual content. For example, the machine-readable optical code and the visual content may be combined into a single view, such as in a picture-in-picture presentation, a split-screen presentation, an overlay presentation, and/or other presentation. The machine-readable optical code and the visual content may be presented into different views, such as presentation of the machine-readable optical code followed by presentation of the visual content and/or vice-versa. The machine-readable optical code may be presented at one or more fixed locations and/or may change location dynamically during presentation.

Figure 7A:
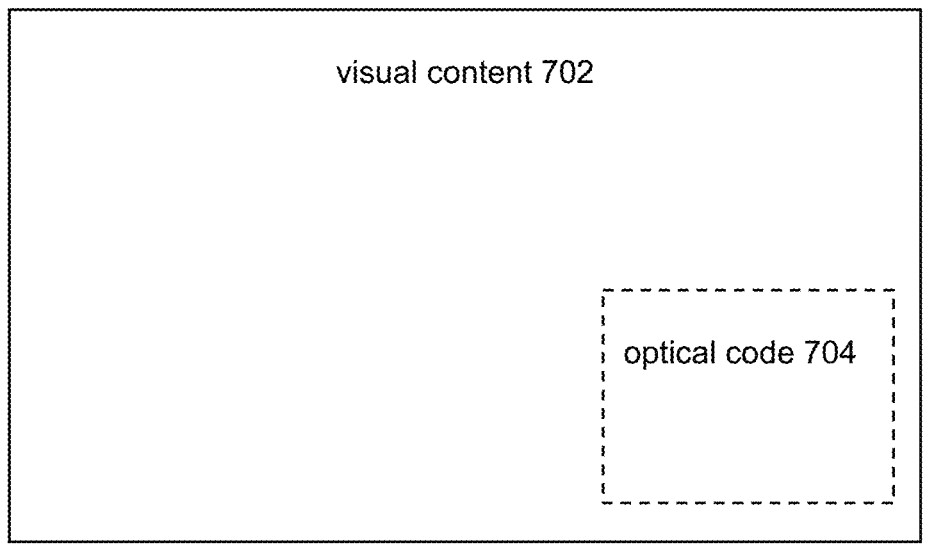
FIGS. 7A-7B illustrate example spatial presentations of a machine-readable optical code with visual content.
Figure 7B:
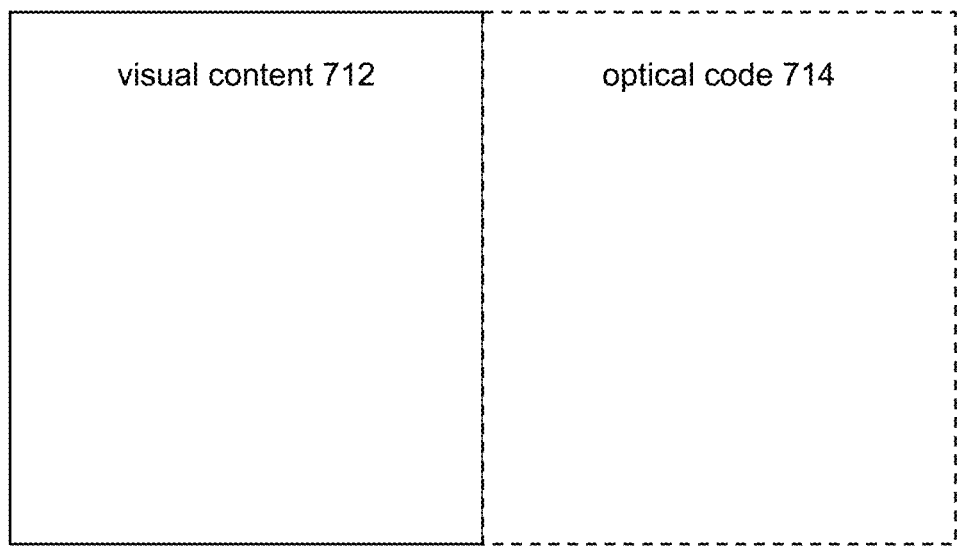

FIGS. 7A-7B illustrate example spatial presentations of a machine-readable optical code with visual content during subsequent presentation of the visual content. In FIG. 7A, optical code 704 may be associated with visual content 702 such that subsequent presentation of the visual content 702 includes simultaneous presentation of the optical code 704. As shown in FIG. 7A, the optical code 704 may be overlaid over a spatial portion (e.g., bottom-right spatial portion) of the visual content 702 during subsequent presentation of the visual content 702. In some implementations, the spatial location of the optical code 704 within the visual content 702 may be determined based on one or more default configurations. In some implementations, the spatial location of the optical code 704 within the visual content 702 may be determined based on user input (e.g., where the optical code 704 was dropped in the visual content 702).

In some implementations, the spatial location of the optical code 704 within the visual content 702 may change as a function of progress through a progress length of the visual content 702. For instance, the visual content 702 may include a video and the optical code 704 may be associated with a depiction of an object captured within the video. The location of the object within the video may change as a function of progress through the progress length of the video (e.g., based on the object moving during video capture, based on the image capture device moving during video capture). The optical code 714 may follow the depiction of the object within the video during playback of the video.

In FIG. 7B, an optical code 714 may be associated with visual content 712 such that subsequent presentation of the visual content 712 includes simultaneous presentation of the optical code 714. As shown in FIG. 7B, the optical code 714 may be presented on one side while the visual content 712 may be presented on another side.

In some implementations, the machine-readable optical code may be presented using one or more graphical user interfaces. For example, referring to FIG. 5A, subsequent presentation of visual content may be included within the display portion 502 of the graphical user interface 500 (or similar graphical user interface) and the machine-readable optical code may be presented within one or more of the visual representation portions 512, 514, 516, 518, 520, 522. Other spatial arrangements of visual content and machine-readable optical code are contemplated.

While the FIGS. 5A, 7A, and 7B illustrate simultaneous presentation of the visual content and the machine-readable optical code, this is merely as example and not meant to be limiting. In some implementations, the visual content and the machine-readable optical code may be presented non-simultaneously/at different times.

A subsequent presentation of the visual content including a presentation of the machine-readable optical code may include the machine-readable optical code being temporally arranged with the progress length of the visual content. The progress length of the visual content may correspond to a length for which the visual content is presented. The progress length of the visual content may be measured in terms of time duration, frame numbers, and/or other ways. A subsequent presentation of the visual content may include the machine-readable optical code being presented before, after, and/or during the subsequent presentation of the visual content.

Figure 8A:
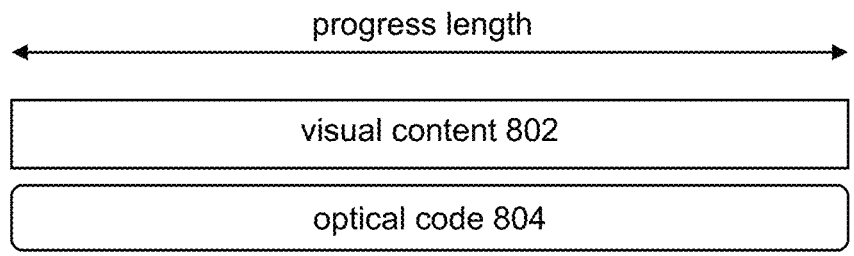
FIGS. 8A-8F illustrate example temporal presentations of a machine-readable optical code with visual content.
Figure 8B:
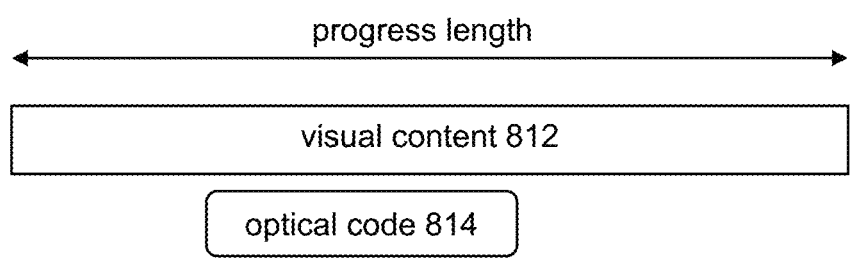
Figure 8C:
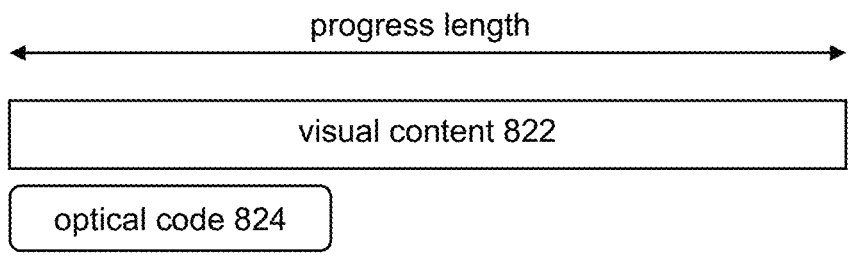
Figure 8D:
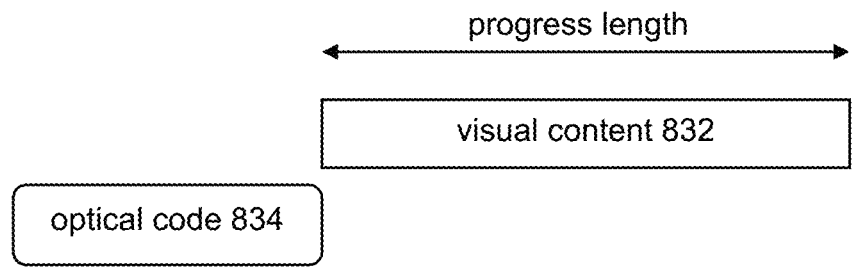
Figure 8E:
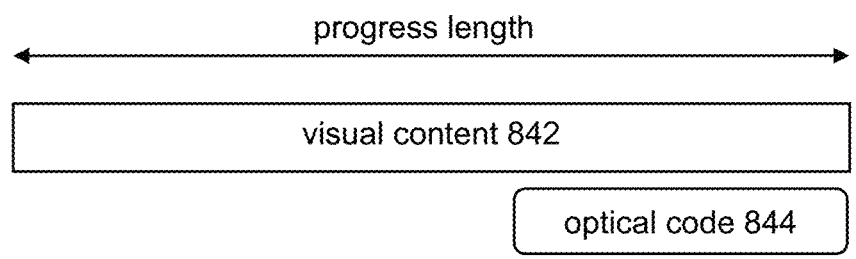
Figure 8F:
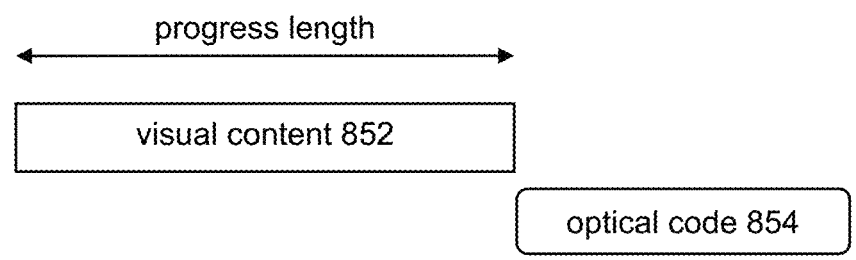

FIGS. 8A-8F illustrate example temporal presentations of a machine-readable optical code with visual content during subsequent presentation of the visual content. In FIG. 8A, visual content 802 may be associated with an optical code 804. During a subsequent presentation of the visual content, 802 the optical code 804 may be presented during the entire progress length of the visual content 802. In FIG. 8B, visual content 812 may be associated with an optical code 814. During a subsequent presentation of the visual content 812, the optical code 814 may be presented during a middle portion of the progress length of the visual content 812. In FIG. 8C, visual content 822 may be associated with an optical code 824. During a subsequent presentation of the visual content 822, the optical code 824 may be presented during a beginning portion of the progress length of the visual content 822. In FIG. 8D, visual content 832 may be associated with an optical code 834. During a subsequent presentation of the visual content 832, the optical code 834 may be presented before the visual content 832 is presented (e.g., in the introduction). In FIG. EC, visual content 842 may be associated with an optical code 844. During a subsequent presentation of the visual content 842, the optical code 844 may be presented during an ending portion of the progress length of the visual content 842. In FIG. 8E, visual content 852 may be associated with an optical code 854. During a subsequent presentation of the visual content 852, the optical code 854 may be presented after the visual content 852 is presented (e.g., in the ending). In some implementations, such as in the subsequent presentation of visual content shown in FIGS. 8A, 8B, 8C, and/or 8E, the machine-readable optical code may be overlaid over the presentation of the visual content.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

Although processor 11 and electronic storage 13 are shown to be connected to interface 12 in FIG. 1, any communication medium may be used to facilitate interaction between any components of system 10. One or more components of system 10 may communicate with each other through hard-wired communication, wireless communication, or both. For example, one or more components of system 10 may communicate with each other through a network. For example, processor 11 may wirelessly communicate with electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which the processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While the computer program components are described herein as being implemented via processor 11 through machine readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components 102 and/or 104 may be eliminated, and some or all of its functionality may be provided by other computer program components. As another example, the processor 11 may be configured to execute one or more additional computer program components that may perform some or all of the functionality attributed to one or more of computer program components 102 and/or 104 described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
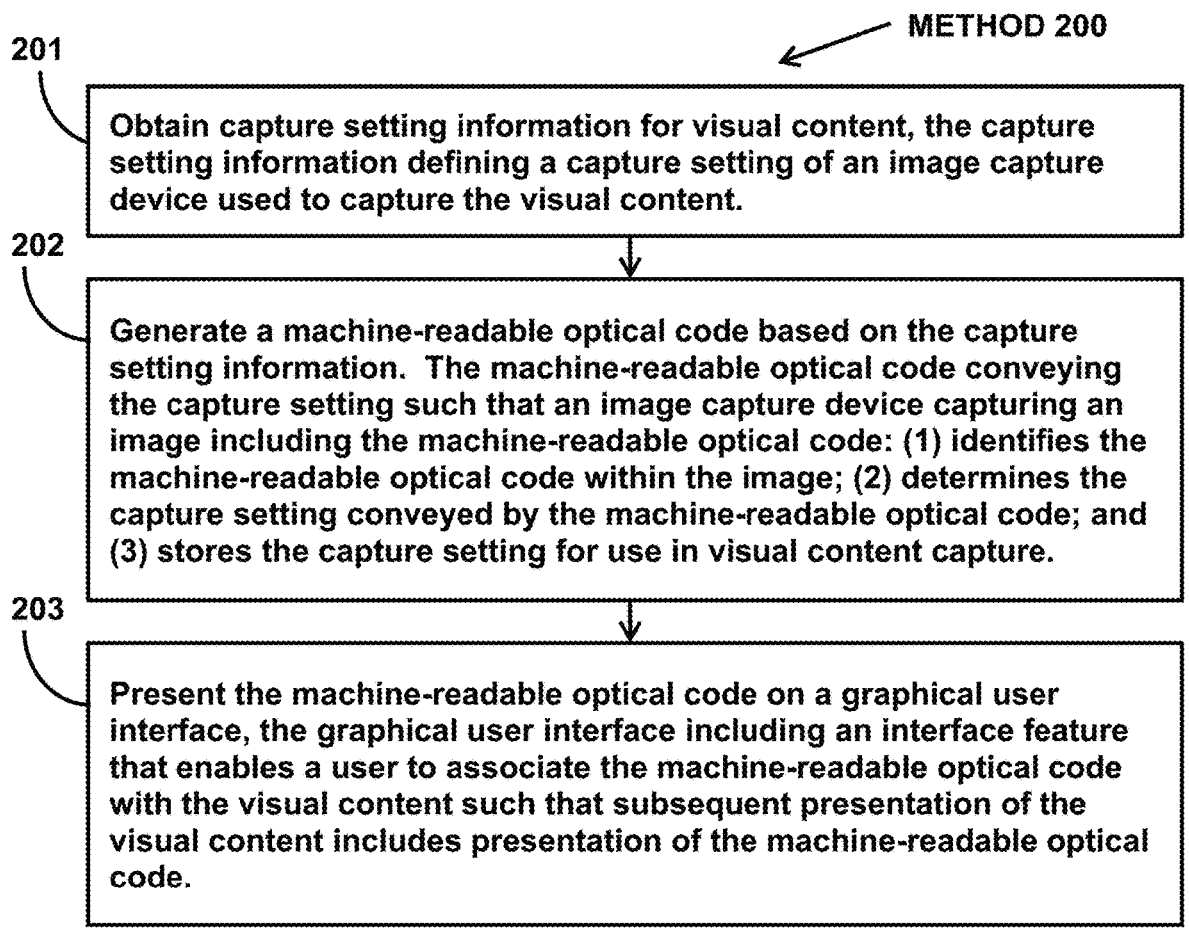
FIG. 2 illustrates a method for sharing capture settings for visual content capture.

FIG. 2 illustrates method 200 for sharing capture settings for visual content capture. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 201, capture setting information for visual content may be obtained. The capture setting information may define a capture setting of an image capture device used to capture the visual content. In some implementation, operation 201 may be performed by a processor component the same as or similar to the capture setting component 102 (Shown in FIG. 1 and described herein).

At operation 202, a machine-readable optical code may be generated based on the capture setting information and/or other information. The machine-readable optical code may convey the capture setting. The machine-readable optical code may convey the capture setting such that an image capture device capturing an image including the machine-readable optical code may: (1) identify the machine-readable optical code within the image; (2) determine the capture setting conveyed by the machine-readable optical code; and (3) store the capture setting for use in visual content capture. In some implementation, operation 202 may be performed by a processor component the same as or similar to the optical code component 104 (Shown in FIG. 1 and described herein).

At operation 203, the machine-readable optical code may be presented on a graphical user interface. The graphical user interface may include an interface feature that enables a user to associate the machine-readable optical code with the visual content such that subsequent presentation of the visual content includes presentation of the machine-readable optical code. The association of the machine-readable optical code with the visual content may cause subsequent presentation of the visual content to include presentation of the machine-readable optical code. In some implementation, operation 203 may be performed by a processor component the same as or similar to the presentation component 106 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for sharing capture settings for visual content capture, the system comprising: one or more physical processors configured by machine-readable instructions to: generate a machine-readable optical code, the machine-readable optical code conveying a first capture setting used by a first image capture device to capture visual content; and present the machine-readable optical code and the visual content on a graphical user interface for potential association of the machine-readable optical code with the visual content, the graphical user interface enabling a user to associate the machine-readable optical code with the visual content for subsequent presentation of the visual content via drag and drop of the machine-readable optical code on the visual content, wherein responsive to user association of the machine-readable optical code with the visual content via the drag and drop of the machine-readable optical code on the visual content, subsequent presentation of the visual content includes presentation of the machine-readable optical code; wherein the machine-readable optical code conveys the first capture setting to a second image capture device capturing an image including the machine-readable optical code, the second image capture device determining the first capture setting conveyed by the machine-readable optical code for use in the visual content capture by the second image capture device, wherein usage of the first capture setting by the second image capture device while operating in accordance with a second capture setting different from the first capture setting conveyed by the machine-readable optical code results in the second image capture device operating in accordance with the first capture setting rather than the second capture setting.

2. The system of claim 1, wherein the first capture setting defines one or more aspects of operation for the first image capture device, a processor of the first image capture device, an image sensor of the first image capture device, and/or an optical element of the first image capture device.

3. The system of claim 2, wherein the one or more aspects of operation for the first image capture device include one or more of a capture mode, a capture resolution, a capture framerate, a capture field of view, a capture visual processing, and/or a capture shutter speed.

4. The system of claim 1, wherein the first capture setting defines one or more conditional aspects of operation for the first image capture device.

5. The system of claim 1, wherein the machine-readable optical code further conveys a name for the first capture setting.

6. The system of claim 1, wherein the graphical user interface further enables the user to associate the machine-readable optical code with the visual content via a toggle button that enables the user to toggle between association and non-association of the machine-readable optical code with the visual content.

7. The system of claim 1, wherein the first capture setting conveyed by the machine-readable optical code is stored as a capture mode on the second image capture device, and the second image capture device uses the first capture setting in the visual content capture based on usage of the capture mode.

8. The system of claim 7, wherein the usage of the first capture setting by the second image capture device while operating in accordance with the second capture setting different from the first capture setting conveyed by the machine-readable optical code further results in the second image capture device temporarily storing the second capture setting and switching back to operating in accordance with the second capture setting after the capture mode has been used.

9. The system of claim 1, wherein the subsequent presentation of the visual content including the presentation of the machine-readable optical code includes the machine-readable optical code being presented before or after the subsequent presentation of the visual content.

10. The system of claim 1, wherein the subsequent presentation of the visual content including the presentation of the machine-readable optical code includes the machine-readable optical code being presented during the subsequent presentation of the visual content.

11. A method for sharing capture settings for visual content capture, the method performed by a computing system including one or more processors, the method comprising: generating, by the computing system, a machine-readable optical code, the machine-readable optical code conveying a first capture setting used by a first image capture device to capture visual content; and presenting, by the computing system, the machine-readable optical code and the visual content on a graphical user interface for potential association of the machine-readable optical code with the visual content, the graphical user interface enabling a user to associate the machine-readable optical code with the visual content for subsequent presentation of the visual content via drag and drop of the machine-readable optical code on the visual content, wherein responsive to user association of the machine-readable optical code with the visual content via the drag and drop of the machine-readable optical code on the visual content, subsequent presentation of the visual content includes presentation of the machine-readable optical code; wherein the machine-readable optical code conveys the first capture setting to a second image capture device capturing an image including the machine-readable optical code, the second image capture device determining the first capture setting conveyed by the machine-readable optical code for use in the visual content capture by the second image capture device, wherein usage of the first capture setting by the second image capture device while operating in accordance with a second capture setting different from the first capture setting conveyed by the machine-readable optical code results in the second image capture device operating in accordance with the first capture setting rather than the second capture setting.

12. The method of claim 11, wherein the first capture setting defines one or more aspects of operation for the first image capture device, a processor of the first image capture device, an image sensor of the first image capture device, and/or an optical element of the first image capture device.

13. The method of claim 12, wherein the one or more aspects of operation for the first image capture device include one or more of a capture mode, a capture resolution, a capture framerate, a capture field of view, a capture visual processing, and/or a capture shutter speed.

14. The method of claim 11, wherein the first capture setting defines one or more conditional aspects of operation for the first image capture device.

15. The method of claim 11, wherein the machine-readable optical code further conveys a name for the first capture setting.

16. The method of claim 11, wherein the graphical user interface further enables the user to associate the machine-readable optical code with the visual content via a toggle button that enables the user to toggle between association and non-association of the machine-readable optical code with the visual content.

17. The method of claim 11, wherein the first capture setting conveyed by the machine-readable optical code is stored as a capture mode on the second image capture device, and the second image capture device uses the first capture setting in the visual content capture based on usage of the capture mode.

18. The method of claim 17, wherein the usage of the first capture setting by the second image capture device while operating in accordance with the second capture setting different from the first capture setting conveyed by the machine-readable optical code further results in the second image capture device temporarily storing the second capture setting and switching back to operating in accordance with the second capture setting after the capture mode has been used.

19. The method of claim 11, wherein the subsequent presentation of the visual content including the presentation of the machine-readable optical code includes the machine-readable optical code being presented before or after the subsequent presentation of the visual content.

20. The method of claim 11, wherein the subsequent presentation of the visual content including the presentation of the machine-readable optical code includes the machine-readable optical code being presented during the subsequent presentation of the visual content.

* * * * *